H. C. HUNTER & J. EVERDING.
Device for Transmitting Motion.
No. 203,155.   Patented April 30, 1878.
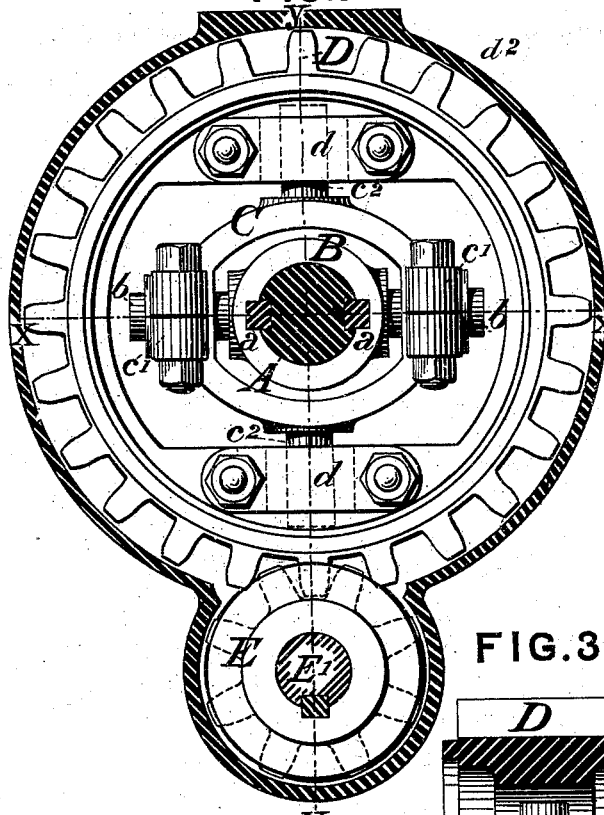
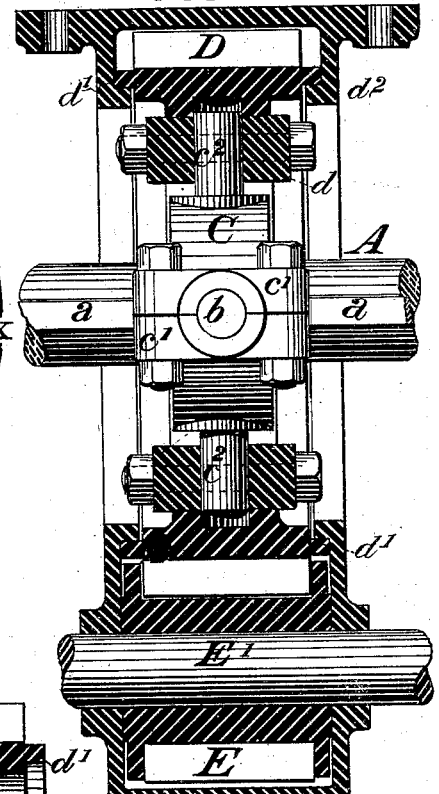
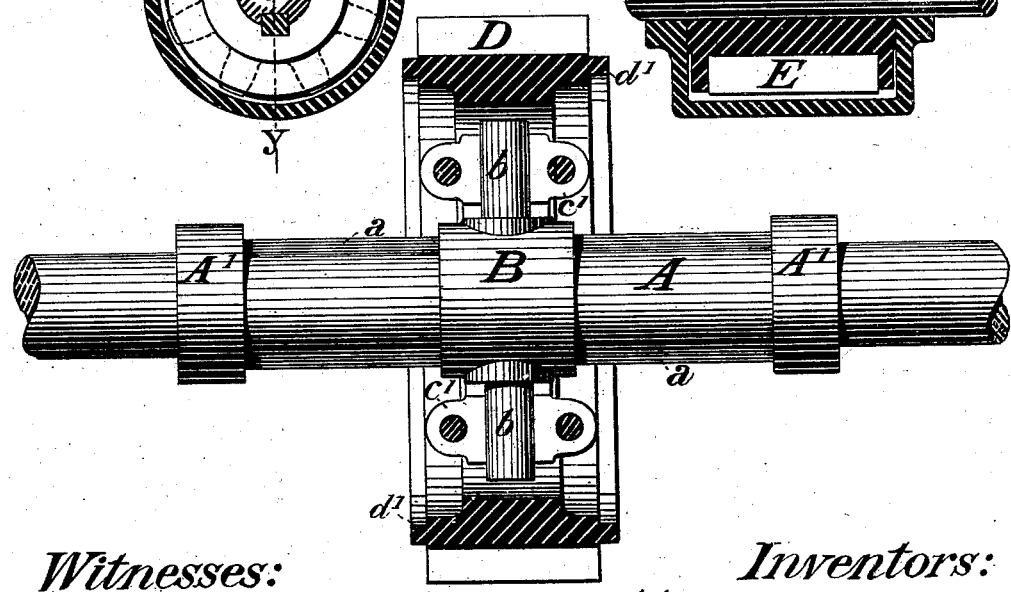
Witnesses:
Geo. H. Vaillant.
S. R. Bell.
Inventors:
Henry C. Hunter
John Everding,
by J. Snowden Bell
Atty.

UNITED STATES PATENT OFFICE.

HENRY C. HUNTER AND JOHN EVERDING, OF PHILADELPHIA, PA.; SAID HUNTER ASSIGNOR TO ABRAHAM S. JENKS, OF SAME PLACE.

IMPROVEMENT IN DEVICES FOR TRANSMITTING MOTION.

Specification forming part of Letters Patent No. 203,155, dated April 30, 1878; application filed January 25, 1878.

*To all whom it may concern:*

Be it known that we, HENRY C. HUNTER and JOHN EVERDING, both of the city and county of Philadelphia, in the State of Pennsylvania, have invented certain new and useful Improvements in Devices for Transmitting Motion, of which the following is a specification:

The object of our invention is to provide side or circumferential transmission of rotary motion to or from a shaft mounted in rigid bearings from or to another shaft, which, while it is normally either parallel or at right angles to the first, has the capacity of variation from such parallelism or fixed angularity, as well as that of limited variation of distance from the first shaft, and of end motion in its bearings; to which end our improvements consist in the combination of a collar, which is fitted to slide longitudinally upon one or more keys or feathers on a rotary shaft mounted in movable bearings, said collar having upon its periphery two radial trunnions, an outer collar surrounding without bearing on the first-named collar, and having bearings to receive the trunnions thereof, and also two trunnions at right angles to said bearings, and a gear-wheel supported independently of but rotated by the keyed or feathered shaft, said gear-wheel having bearings which receive, with the capacity of end motion, the trunnions of the outer collar, and meshing with a gear-wheel secured upon a shaft mounted in fixed bearings, as hereinafter more fully set forth.

In the accompanying drawing, Figure 1 is an end view, in elevation, showing our improvements applied to spur-gearing; Fig. 2, a transverse sectional elevation at the line $y\,y$ of Fig. 1; and Fig. 3, a similar view at the line $x\,x$ of Fig. 1.

The shaft A, which is mounted in movable bearings, and which has a range of end motion therein equal to the distance between the inner faces of the fixed collars A', formed upon it, less the length of the collar B, (see Fig. 3,) is provided with two keys or feathers, $a$, upon which said collar B is fitted to slide longitudinally. Two radial trunnions, $b$, are formed upon the collar B, and fit in bearings $c^1$ in an outer collar, C, which encircles the collar B at such distance therefrom as corresponds to the greatest degree of deviation from normal alignment admitted to the shaft A. The collar C is formed in two sections, which are bolted together at the bearings $b$, and has two radial trunnions, $c^2$, upon its periphery at right angles to said bearings, these trunnions fitting in bearings $d$, secured to spur-gear D near its rim. Each pair of trunnions has the capacity of end motion in the bearings in which it fits. The gear D has no central hub or arms, an open space being left within its rim for the insertion of the collars B and C, and is supported by means of a circumferential rim or flange, $d^1$, which bears on a fixed support or hanger, $d^2$, so that the gear D, while deriving rotary motion from the shaft A, through the collars and trunnions, is supported independently of said shaft, and, consequently, remains constantly in gear with, and properly transmits its motion to, the spur-pinion E, secured upon the shaft E', which is mounted in fixed bearings. In case no end motion of the shaft A is to be provided for, the shaft-collar B and the keys or feathers $a$ may be dispensed with, and the trunnions $b$ would, in such case, be formed upon or secured directly to the shaft A.

We have in this instance shown our improvements as applied to spur-gearing transmission of motion between two shafts whose axes are normally parallel; but frictional gearing may be employed with equal facility, or, in the case where the axes of the two shafts are normally at right angles, bevel or worm and worm-wheel gearing may be substituted without departing from the spirit of our invention.

We claim as our invention and desire to secure by Letters Patent—

The combination, with a gear-wheel supported independently of its shaft, of a collar fitted upon said shaft, and having two radial trunnions, and an outer collar having bearings in which the trunnions of the shaft-collar have end motion, and radial trunnions at right angles to said bearings, the trunnions of the outer collar fitting, with the capacity of end motion, in bearings in or near the rim of the gear-wheel, substantially as set forth.

HENRY C. HUNTER.
JOHN EVERDING.

Witnesses:
J. SNOWDEN BELL,
GEO. A. VAILLANT.